United States Patent [19]

Conti et al.

[11] Patent Number: 4,810,695

[45] Date of Patent: Mar. 7, 1989

[54] CHITOSAN DERIVATIVES IN THE FORM OF COORDINATED COMPLEXES WITH FERROUS IONS

[75] Inventors: Franco Conti, Milan; Vito Marinoni, Biella, both of Italy

[73] Assignee: Establissement Texcontor, Switzerland

[21] Appl. No.: 861,706

[22] Filed: May 12, 1986

[51] Int. Cl.[4] .................... A61K 31/73; A61K 31/72; C08B 37/08; C08B 37/00
[52] U.S. Cl. ........................................ 514/55; 536/20; 536/55.3; 536/121; 536/122; 536/17.1; 536/124; 514/814
[58] Field of Search ................... 514/55, 814; 424/147; 536/17.1, 20, 121, 122, 124, 55.3

[56] References Cited

U.S. PATENT DOCUMENTS

| Re. 24,642 | 4/1959 | London et al. | 514/814 |
|---|---|---|---|
| 2,755,275 | 7/1956 | Cushing et al. | 536/20 |
| 2,893,916 | 7/1959 | Rubin | 514/814 |
| 2,955,981 | 10/1960 | Linkenheimer | 514/814 |
| 3,794,722 | 2/1974 | Taya | 514/814 |
| 3,908,004 | 9/1975 | Kitching | 514/814 |
| 4,138,480 | 2/1979 | Gosalvez | 536/121 |
| 4,189,474 | 2/1980 | Kurosaki et al. | 514/814 |
| 4,337,335 | 6/1982 | Nagabhushan et al. | 536/121 |
| 4,368,322 | 1/1983 | Muzzarelli | 536/17.2 |
| 4,623,539 | 11/1986 | Tunc | 514/55 |
| 4,659,697 | 4/1987 | Tanaka | 514/814 |
| 4,689,322 | 8/1987 | Kulbe et al. | 536/121 |

FOREIGN PATENT DOCUMENTS

| 0148057 | 7/1985 | European Pat. Off. | 536/20 |
|---|---|---|---|
| 60-142923 | 7/1985 | Japan | 514/55 |
| 0746870 | 3/1956 | United Kingdom | 536/20 |

*Primary Examiner*—Ronald W. Griffin
*Assistant Examiner*—Nancy S. Carson
*Attorney, Agent, or Firm*—Parkhurst, Oliff & Berridge

[57] ABSTRACT

Chitosan derivatives in the form of coordinated complexes with ferrous ions in which coordinated bonds are established between the ferrous ion and the amino group and hydroxyl group present respectively in position 2 and position 3 of the chitosanglucosamine ring.

Said chitosan derivatives are soluble in an aqueous medium and are able to release iron into the gastrointestinal tract in a controlled manner.

12 Claims, No Drawings

CHITOSAN DERIVATIVES IN THE FORM OF COORDINATED COMPLEXES WITH FERROUS IONS

This invention relates to chitosan derivatives in the form of coordinated complexes with ferrous ions.

More particularly, the invention relates to chitosan derivatives in the form of coordinated complexes with ferrous ions, which are soluble in an aqueous medium and able to release the iron into the gastrointestinal tract in a controlled manner.

Such derivatives comprise chitosans of the 6-O-sulphate type (I)

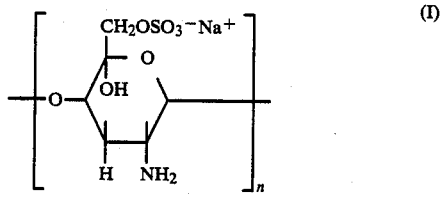

in which n varies from 250 to 2300, in the form of complexes in which coordinate bonds are established between $Fe^{++}$ and the amino group and hydroxyl group present respectively in position 2 and position 3 in the residual chitosan units.

Chitosan (II):

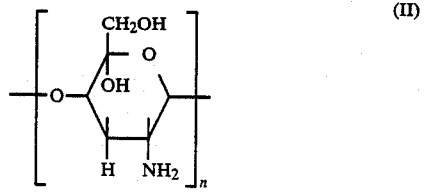

is a polysaccharide obtained by the deacetylation of chitin by treatment with strong bases.

Chitin is itself a widely distributed natural polysaccharide consisting essentially of N-acetyl-D-glucosamine units, of formula:

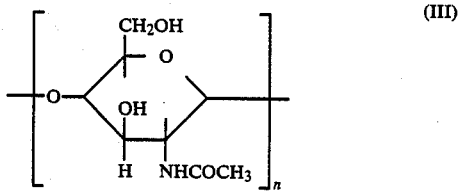

The chitosan used in the process according to the present invention was obtained from chitin extracted from crab shells by treatment with a 50 weight% NaOH solution under boiling conditions.

The molecular weight of this chitosan, determined by a viscosimetric method, was found to be between 50,000 and 400,000, and its degree of deacetylation, determined by a potentiometric method, was found to be between 80 and 92%.

The process for preparing soluble derivatives of chitosan with the property of controlled Fe release, according to the present invention, comprises the following stages:

(a) dissolving the chitosan (II) in an organic acid;
(b) adding a ferrous sulphate solution to precipitate the coordinated complex;
(c) filtering, washing and drying the precipitated complex;
(d) sulphating said complex by treatment with $SO_3$-organic base or chlorosulphonic acid-methylformamide complexes.

The chitosan is dissolved in accordance with stage (a) in an aqueous solution of an organic acid, preferably acetic acid or formic acid, of concentration between 1% and 5% by volume, at ambient temperature.

Stage (b) is conducted by adding to the solution of stage (a) a ferrous sulphate solution in a molar quantity of between 1 and 5 times the chitosan, operating at a pH of between 2 and 7, at a temperature of between 10° and 25° C., under agitation for 2-16 hours.

The mixture resulting from the reaction is filtered to recover the precipitated complex, which is washed with water and methanol and then dried under vacuum at 40°-50° C.

The sulphation reaction of stage (d) is conducted in a medium consisting of anhydrous dimethylformamide, using as sulphating agent a complex of sulphur trioxide with an organic base such as pyridine, trimethylamine, triethylamine or dimethylformamide, or a complex of chlorosulphonic acid with formamide, dimethylformamide or other organic bases.

The sulphation reaction is conducted at a temperature of between 0° and 2° C. for 20-60 minutes and then at ambient temperature for 16-48 hours.

At the end of this period, the mixture obtained after sulphation is neutralised with an inorganic base such as $NaHCO_3$ or KOH and then dialysed against water until the organic base and inorganic salts present have been completely eliminated.

The product obtained has a degree of substitution between 0.85 and 1.0 and an iron content of between 4 and 15%. The molecular weight is between 50,000 and 400,000, indicating that the sulphation reaction, under the conditions of the present invention, does not lead to degradation of the polysaccharide molecules.

The product, in its sulphated form, has high solubility and can therefore be used in the form of a solution in treatment for compensating iron deficiency.

In order to evaluate the human absorption of the iron contained in the chitosan derivatives according to the invention, we used the method described by Brice H. and Hallenberg L. (Acta Med. Scand. Suppl. 376, 171: 7-22, 1962) which uses tagged iron $Fe^{55}$ and $Fe^{59}$. By this method it is possible to study the absorption of two iron-based products simultaneously by the same subject.

To eight healthy subjects with normal sideremia and siderophilin, we orally administered 30 mg of ferrous sulphate tagged with one isotope and the following day we administered the same quantity of iron in the form of the chitosan derivative according to the invention, Product A, containing the other isotope.

We then studied the percentage of iron absorbed from the two preparations (Table 1).

From Table 1 it can be seen that the iron contained in Product A is absorbed at intestinal level in a decidedly greater percentage than that of the iron contained in the ferrous sulphate.

TABLE 1

Intestinal absorption of the iron contained in ferrous sulphate and in Product A

| Subject | Absorption | |
|---|---|---|
| | FeSO$_4$ | Product A |
| MH | 9.2 | 11.6 |
| RD | 4.5 | 8.9 |
| TW | 7.9 | 10.8 |
| AN | 20.4 | 23.2 |
| BF | 15.1 | 17.4 |
| GD | 5.6 | 6.2 |
| FE | 7.5 | 8.0 |
| AN | 6.4 | 7.8 |
| M | 9.57 | 11.73 |
| DS | 5.43 | 5.76 |
| P* | | <0.05 |

*Student t test for flattened data.

To determine the tolerability of Product A it was administered to 30 geriatric patents with sideropenic anemia, at a dose of 60 mg/day of iron for an average period of 38 days. Product A was taken in aqueous solution once or twice a day according to the preference of the patient, without obligatory connection with meals.

The treatment was very well tolerated in all patients, and no dyspeptic, intestinal or other disturbances were complained of.

The sideremia underwent an average percentage increase of 21%, with a hemoglobin increase and an improvement in patient subjectivity.

One example of the process for preparing chitosan derivatives according to the invention is given hereinafter for the purposes of non-limitative illustration.

EXAMPLE 1

100 grams of chitosan having a molecular weight of 350,000 and an 80% degree of acetylation are dissolved in 500 ml of a 2 vol% aqueous formic acid solution at ambient temperature.

To the solution obtained, 50 ml of a ferrous sulphate solution of concentration 330 g/l are added to obtain a solution of pH 2.5 which is kept under agitation at a temperature of 25° C. for 16 hours.

The reaction mixture is filtered to recover the chitosan derivative, which is washed with water and then dried at 40° C. under vacuum.

The product thus obtained is dispersed in 400 ml of anhydrous dimethylformamide, and 7.6 g of the SO$_3$-pyridine complex are added, the mixture being kept under agitation at a temperature of 1° C. for 40 minutes, then at ambient temperature for 35 hours.

The reaction mixture thus obtained is neutralised by adding a 10 weight% NaHCO$_3$ solution, and is then dialysed against water until the organic base and inorganic salts present are completely eliminated.

The product is recovered by drying under vacuum.

In this manner, 14.5 g of a chitosan derivative are obtained having the following characteristics:
degree of substitution of sulphate groups: 0.9
Fe content: 9%

What is claimed is:

1. Chitosan derivatives in the form of coordinated complexes with ferrous ions comprising chitosans of formula (I)

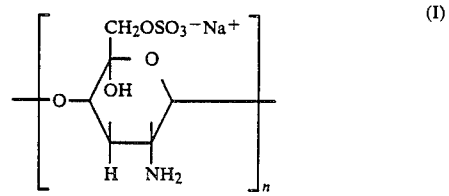

in which n varies from 250 to 2300, in the form of complexes in which coordinate bonds are established between Fe$^{++}$ and the amino group and hydroxyl group present respectively in position 2 and position 3 of the chitosan glucosamide ring.

2. A process for preparing chitosan derivatives in the form of coordinated complexes with ferrous ions comprising chitosan of formula (I)

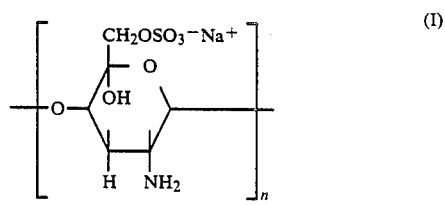

in which n varies from 250 to 2300, in the form of complexes in which coordinate bonds are established between Fe$^{++}$ and the amino group and hydroxyl group present respectively in position 2 and position 3 of the chitosan glucosamide ring, comprising the following steps:

(a) dissolving a chitosan of formula (II)

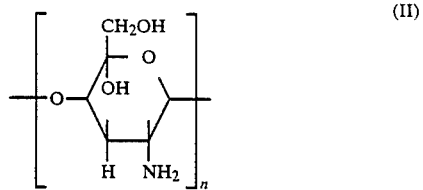

in an organic acid;

(b) adding a ferrous sulphate solution to precipitate the coordinated complex;

(c) filtering, washing and drying the precipitated complex;

(d) sulphating the dried complex by means of an SO$_3$-organic base complex, followed by treatment with a strong inorganic base.

3. A process as claimed in claim 2, wherein the chitosan is dissolved in acetic or formic acid of concentration between 1 and 5% by volume, at ambient temperature.

4. A process as claimed in claim 2, wherein the ferrous sulphate is added in the form of a ferrous sulphate solution of concentration between 200 and 600 g/l, operating at a pH of between 2 and 7 and at a temperature of between 5° and 25° C.

5. A process as claimed in claim 2, wherein the weight ratio of the chitosan to the added ferrous sulphate is between 1 and 5.

6. A process as claimed in claim 2, wherein the dried complex is sulphated by using as sulphating agent a complex of sulphur trioxide with a weak base selected from the group consisting of pyridine, trimethylamine, triethylamine or dimethylformamide, in a reaction medium consisting of anhydrous dimethylformamide.

7. A process as claimed in claim 2, characterised in that the dried complex is sulphated by using as sulphating agent a complex of chlorosulphonic acid with formamide or with dimethylformamide.

8. Pharmaceutical compositions comprising chitosan derivatives in the form of coordinated complexes with ferrous ions as defined and prepared in accordance with claim 2 and a pharmaceutically acceptable carrier.

9. A process for preparing chitosan derivatives consisting of coordinated complexes with ferrous ions of chitosan having the formula (I)

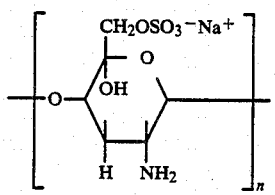

in which n is between 250 and 2300 and the coordinated bonds are established between Fe++ and the amino group and hydroxyl group present respectively in positions 2 and 3 of the chitosan glucosamide ring, comprising the following steps:

(a) dissolving a chitosan of formula (II)

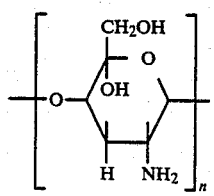

in an aqueous solution of concentration between 1% and 5% by vol. of an organic acid selected from the group consisting of formic and acetic acid;

(b) adding to the said solution a ferrous sulfate solution in a molar quantity of between 1 and 5 times the chitosan, at pH of between 2 and 7, at a temperature of between 10° and 25° C. and keeping under agitation for 2 to 16 hours;

(c) filtering, washing with water and methanol, and drying under vacuum at 40°–50° C. the precipitated complex;

(d) sulfating the dried precipitate in dimethylformamide at a temperature between 0° and 2° C. for 20 to 60 minutes and then at ambient temperature for 16 to 48 hours, by means of a sulfating agent selected from the group consisting of a complex of sulfur trioxide or chlorosulfonic acid, with an organic base; and (e) neutralizing the reaction mixture with an inorganic base and dialysing against water until the organic base and inorganic salts present have been completely eliminated.

10. A process of claim 9 wherein the ferrous sulfate solution has a concentration between 200 and 600 g/l.

11. A process of claim 9 wherein the organic base of the sulfating agent is selected from the group consisting of pyridine, trimethylamine, triethylamine, dimethylformamide, and formamide.

12. A pharmaceutical composition for treating iron deficiency which comprises a therapeutically effective amount of chitosan derivative of formula (I)

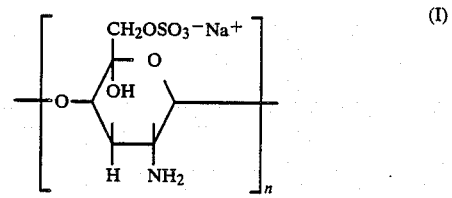

in which n varies from 250 to 2300, in the form of complexes in which coordinate bonds are established between Fe++ and the amino group and hydroxyl group present respectively in position 2 and position 3 of the chitosan glucosamide ring;

and a pharmaceutically acceptable carrier.

* * * * *